(12) United States Patent
Jeng et al.

(10) Patent No.: US 10,881,167 B2
(45) Date of Patent: Jan. 5, 2021

(54) SHOE MIDSOLE STRUCTURE AND METHOD FOR MANUFACTURING SAME

(71) Applicant: Jeng-Ywan Jeng, Taipei (TW)

(72) Inventors: Jeng-Ywan Jeng, Taipei (TW); Ajeet Kumar, Taipei (TW)

(73) Assignee: Jeng-Ywan Jeng, Taipei (TW)

( * ) Notice: Subject to any disclaimer, the term of this patent is extended or adjusted under 35 U.S.C. 154(b) by 89 days.

(21) Appl. No.: 16/367,295

(22) Filed: Mar. 28, 2019

(65) Prior Publication Data

US 2020/0268098 A1  Aug. 27, 2020

(30) Foreign Application Priority Data

Feb. 22, 2019  (TW) .............................. 108106078 A

(51) Int. Cl.
| | | |
|---|---|---|
| *A43B 13/12* | (2006.01) | |
| *A43B 13/04* | (2006.01) | |
| *B29D 35/14* | (2010.01) | |
| *A43B 13/14* | (2006.01) | |
| *A43B 13/20* | (2006.01) | |
| *A43B 13/18* | (2006.01) | |

(52) U.S. Cl.
CPC .............. *A43B 13/12* (2013.01); *A43B 13/04* (2013.01); *A43B 13/141* (2013.01); *A43B 13/181* (2013.01); *A43B 13/20* (2013.01); *A43B 13/206* (2013.01); *B29D 35/142* (2013.01); *B32B 2437/02* (2013.01)

(58) Field of Classification Search
CPC ..... A43B 1/0009; A43B 3/0036; A43B 13/18; A43B 13/181; A43B 13/12; A43B 13/206; A43B 13/20

USPC ..................................................... 36/25 R, 28
See application file for complete search history.

(56) References Cited

U.S. PATENT DOCUMENTS

| | | | | |
|---|---|---|---|---|
| 5,233,767 | A * | 8/1993 | Kramer | A43B 7/081 36/28 |
| 10,721,990 | B2 * | 7/2020 | Campos | A43B 13/125 |
| 2006/0064900 | A1 * | 3/2006 | Aveni | A43B 13/186 36/28 |
| 2014/0109441 | A1 * | 4/2014 | McDowell | A43B 1/0009 36/103 |
| 2016/0122493 | A1 * | 5/2016 | Farris | B29C 44/3403 521/82 |
| 2018/0055144 | A1 * | 3/2018 | Bischoff | B29D 35/0081 |
| 2018/0317600 | A1 * | 11/2018 | Campos | A43B 13/20 |

(Continued)

*Primary Examiner* — Marie D Bays

(57) ABSTRACT

The present invention relates to a shoe midsole structure and a method for manufacturing the same. The shoe midsole has unique hollow particle units that may be additively manufactured without any support structure. Each of the hollow particle units has a specific thickness and a hollow interior. A housing layer of each of the hollow particle units has a plurality of openings, a plurality of planar annular portions surrounding each of the openings, and a plurality of curved portions connecting adjacent planar annular portions. The plurality of openings are disposed in pair on the housing layer symmetrically with respect to the geometric centroid of the hollow particle units. A plurality of hollow particle units are arranged into a multi-laminate structure in the shoe midsole. Some hollow particle units are bent when a compression force or a shearing force is applied during use.

7 Claims, 10 Drawing Sheets

(56) References Cited

U.S. PATENT DOCUMENTS

2020/0107609 A1* 4/2020 Ahn ................... B29D 35/0054
2020/0229538 A1* 7/2020 Yoshinaga ........... B29D 35/122

* cited by examiner

SHOE MIDSOLE STRUCTURE AND METHOD FOR MANUFACTURING SAME

CROSS-REFERENCE TO RELATED APPLICATIONS

The present application claims the benefit of Taiwanese Patent Application No. 108106078 filed on Feb. 22, 2019, the entire contents of which are hereby incorporated by reference.

BACKGROUND OF THE INVENTION

1. Field of the Invention

The present invention relates to a shoe midsole structure and a method for manufacturing the same, and in particular, to a shoe midsole structure having a lattice structure manufactured using an additive manufacturing technology. The shoe midsole structure does not need a support structure and is applicable to cushioning pads, for example, midsoles including a lattice structure of trainers and other types of shoes. The present invention also relates to a method for manufacturing a sole structure. The method includes a method for manufacturing a shoe midsole using the lattice structure.

2. Description of the Related Art

A sport shoe generally consists of a sole and an upper. The sole mainly includes three parts from inside to outside, namely, an insole, a midsole, and an outsole. The insole is usually made of a very soft material, offers comfort for feet, and provides cushioning and stability when a user is running or walking, so as to further protect the ankles, knees, and waist of the user from severe injuries. The midsole is mainly characterized by providing stability, impact energy absorption, and energy release. A conventional midsole is manufactured using an injection compression molding process. The material is ethylene-vinyl acetate (EVA). The outsole of the shoe interacts with the ground during walking or running, and there fore needs to have certain toughness and wear resistance and can provide a traction force.

An injection compression molding process technology is mostly used for manufacturing in the technologies of designing and manufacturing various soles. However, in consideration of human factors such as foot types and sizes and gaits of different users in sole manufacturing, when an injection compression molding process is used, sole sizes cannot be adjusted instantly for different users, and it is also difficult to perform customized production in small batches. Therefore, technologies of designing and manufacturing soles using a three-dimensional printing technology, namely, additive manufacturing have gradually emerged. Especially, the three-dimensional printing technology has high precision and variability, and is particularly applicable to shoe products and customized manufacturing.

At present, in existing methods for manufacturing shoe midsoles using a three-dimensional printing technology, shoes or shoe midsoles having a variety of unique lattice structures are mainly designed and produced using an additive manufacturing method. The shoes or shoe midsoles are applied to trainers and other types of shoes, for example, as in US Patents US2012/0005920A1, U.S. Pat. No. 6,763,611B1, US2017/0181496A1, US2018/0049514A1, US2016/0374428A1, US2016/0051009A1, US2014/0182170A1, US2014/0259787A1, and US2009/0126225.

However, regarding the problems in the lattice structures recorded in the foregoing patents, a support structure needs to be additionally designed in the lattice structures to prevent deformation in uncompleted lattice structures during additive manufacturing such as fused deposition molding, material jetting, and powder bed fusion, and after lattice units are molded, a post-treatment manner needs to be used to remove the support structure. In particular, in the processes of powder bed fusion and vat photopolymerization, the support structure is inherent. For simple designs, the support structure may be automatically created using commercial software. However, for complex shapes, support structures are mostly designed manually, and this becomes the most complex work for process engineers. In addition, after printing is completed, related post-treatment work further needs to be performed to remove the support structure. However, in some cases, it is very difficult or even impossible to remove the support structure. These unnecessary processes increase the material costs, processing time, and energy loss during the additive manufacturing of components.

Therefore, it is expected to develop a special structural unit to offset the disadvantages in the prior art, and the special structural unit can further be applied to a shoe midsole structure that has excellent mechanical stability and comfort and a method for manufacturing the same.

SUMMARY OF THE INVENTION

In view of this, the inventor provides hollow particle units that simulate the appearance and form of urchins. The hollow particle units are applied to a shoe midsole structure. Such a structural shape does not need an additional support structure during three-dimensional printing and has excellent strength and mechanical stability. In addition, a housing body of the hollow particle units bears uniform stress distribution. Therefore, the hollow particle units have better deformation and higher rigidity. Further, the hollow particle units are very efficient in terms of energy return, which is one of the important factors for evaluating runners. Therefore, a lattice structure of the present invention may overcome the problem of the support structure without adversely affecting the comfort and mechanical performance related to shoe midsoles. The present invention further provides a method for manufacturing a shoe midsole according to a user's foot.

In other words, the present invention provides a shoe midsole structure, comprising at least one physical flexible laminate and having a cushioning function of decreasing vibration and absorbing stress, which is characterized in that the physical flexible laminate comprises a plurality of hollow particle units uniformly arranged in the X-axis direction, the Y-axis direction, and the Z-axis direction and evenly distributed as a lattice matrix of an array grid in an identical plane; each of the hollow particle units has a specific thickness and a hollow interior and comprises a housing layer having a plurality of openings, a plurality of planar annular portions surrounding each of the openings, and a plurality of curved portions connecting adjacent planar annular portions; and the plurality of openings are disposed in pair on the housing layer of the hollow particle units symmetrically with respect to the geometric centroid of the hollow particle units.

According to an embodiment of the present invention, the number of the plurality of openings of the hollow particle units is set to N, and N satisfies the following relationship: $100 \geq N \geq 2$; is preferably $50 \geq N \geq 2$; is more preferably $12 \geq N \geq 2$; and is optimally $6 \geq N \geq 2$.

According to an embodiment of the present invention, the number of the plurality of openings is six, the openings are disposed opposite to each other in the X-axis direction, the Y-axis direction, and the Z-axis direction of the hollow particle units, and adjacent hollow particle units are connected to each other via the planar annular portions.

According to an embodiment of the present invention, the hollow particle units have the same equivalent diameter L, and the equivalent diameter L is between 4 mm and 16 mm.

According to an embodiment of the present invention, when the equivalent aperture of the openings is set to R, and the ring width of the planar annular portion adjacent to the openings is set to W, and R and W respectively satisfy the following relationship: $25 \geq R$, and $W \geq 0.01$.

According to an embodiment of the present invention, the equivalent aperture R of the openings is between 1 mm and 10 mm.

According to an embodiment of the present invention, the physical flexible laminate is made of an elastic and/or viscoelastic material, for example, any one of thermoplastic polyurethane (TPU), an EVA copolymer, nylon 11, and a combination thereof.

According to an embodiment of the present invention, the physical flexible laminate has more than two layers.

According to an embodiment of the present invention, the shape of each of the hollow particle units is spherical, elliptical or irregularly spherical.

According to an embodiment of the present invention, the shoe midsole structure further includes at least one solid layer disposed on an upper surface and/or a lower surface of the physical flexible laminate and is used for connecting to an outsole and/or an insole of a sole.

In addition, the present invention may further provide a method for manufacturing a shoe midsole. The method includes: according to the contour of a user's foot, sequentially labeling a first region, a second region, a third region, a fourth region, a fifth region, and a sixth region from the toe to the heel; according to the contour shapes of the first region, the second region, the third region, the fourth region, the fifth region, and the sixth region, forming a three-dimensional model of a shoe midsole having at least one physical flexible laminate, where the physical flexible laminate comprises a plurality of hollow particle units uniformly arranged in the X-axis direction, the Y-axis direction, and the Z-axis direction and evenly distributed as a lattice matrix of an array grid in an identical plane; and performing three-dimensional printing according to the three-dimensional model to obtain the shoe midsole. Each of the hollow particle units has a specific thickness and a hollow interior. A housing layer of the hollow particle unit has a plurality of openings, a plurality of planar annular portions surrounding each of the openings, and a plurality of curved portions connecting adjacent planar annular portions. The plurality of openings are disposed in pair on the housing layer symmetrically with respect to the geometric centroid of the hollow particle units. The number of the plurality of openings of the hollow particle units is set to N, and N satisfies the following relationship: $100 \geq N \geq 2$, and N is even. The plurality of openings are disposed in pair on the housing layer of the hollow particle units symmetrically with respect to the geometric centroid of the hollow particle units.

According to an embodiment of the present invention, the physical flexible laminate has more than two layers, and the equivalent diameters of the hollow particle units arranged in different layers are the same or different.

According to an embodiment of the present invention, in the same physical flexible laminate, when the equivalent aperture of the openings of the hollow particle unit disposed in the first region is set to R1, and the ring width of the planar annular portion is set to W1, R1 and W1 respectively satisfy the following relationship: $10 \geq R1$, and $W1 \geq 0.01$; when the equivalent aperture of the openings of the hollow particle unit disposed in the second region is set to R2, and the ring width of the planar annular portion is set to W2, R2 and W2 respectively satisfy the following relationship: $10 \geq R2$, and $W2 \geq 0.01$; when the equivalent aperture of the openings of the hollow particle unit disposed in the third region is set to R3, and the ring width of the planar annular portion is set to W3, R3 and W3 respectively satisfy the following relationship: $15 \geq R3$, and $W3 \geq 0.1$; when the equivalent aperture of the openings of the hollow particle unit disposed in the fourth region is set to R4, and the ring width of the planar annular portion is set to W4, R4 and W4 respectively satisfy the following relationship: $25 \geq R4$, and $W4 \geq 1$; when the equivalent aperture of the openings of the hollow particle unit disposed in the fifth region is set to R5, and the ring width of the planar annular portion is set to W5, R5 and W5 respectively satisfy the following relationship: $15 \geq R5$, and $W5 \geq 0.1$; and when the equivalent aperture of the openings of the hollow particle unit disposed in the sixth region is set to R6, and the ring width of the planar annular portion is set to W6, R6 and W6 respectively satisfy the following relationship: $10 \geq R6$, and $W6 \geq 0.01$.

According to an embodiment of the present invention, the three-dimensional printing includes fused deposition molding, vat photopolymerization or selective laser sintering (SLS).

Because the shoe midsole of the present invention has hollow particle units with special structures, an additional support structure is not needed during additive manufacturing. The hollow particle units are very stable when pressure is applied, so that energy can be effectively absorbed and the energy can be released when the pressure is removed.

The hollow particle units have shell structures with oblate shapes that imitate urchins. The hollow particle units are designed and optimized for three-dimensional printing, so that a support structure is not needed. A plurality of hollow particle units can forma lattice structure and are arranged into a multi-laminate structure in the shoe midsole. Some hollow particle units are bent when a compression force or a shearing force is applied during use. Such a porous structure is made of any elastic and/or viscoelastic material, is used for cushioning or energy absorption and release, and is suitable for high performance sport shoes such as runners or trainers. The hollow particle units may be changed in size, thickness, and arrangement manner according to related parameters.

To make the foregoing and other objectives, features, and advantages of the present invention more clearly, embodiments are described below in detail with reference to the accompanying drawings.

DETAILED DESCRIPTION OF THE PREFERRED EMBODIMENTS

The detailed description and technical content of the present invention are described below with reference to the accompanying drawings. However, the accompanying drawings are merely used for reference and description, but are not used to limit the present invention. The foregoing and other technical content, characteristics, and efficacy of the present invention are clearly presented in the following detailed description of embodiments with reference to the accompanying drawings. The direction-related terms such as "up", "down", "left", "right", "front", and "rear" used in the following embodiments are only directions with reference to the accompanying drawings. Therefore, the direction-related terms are used for description rather than to limit the present invention. Moreover, in the following embodiments, the same or similar element numerals are used for the same or similar elements.

Figure 1A:
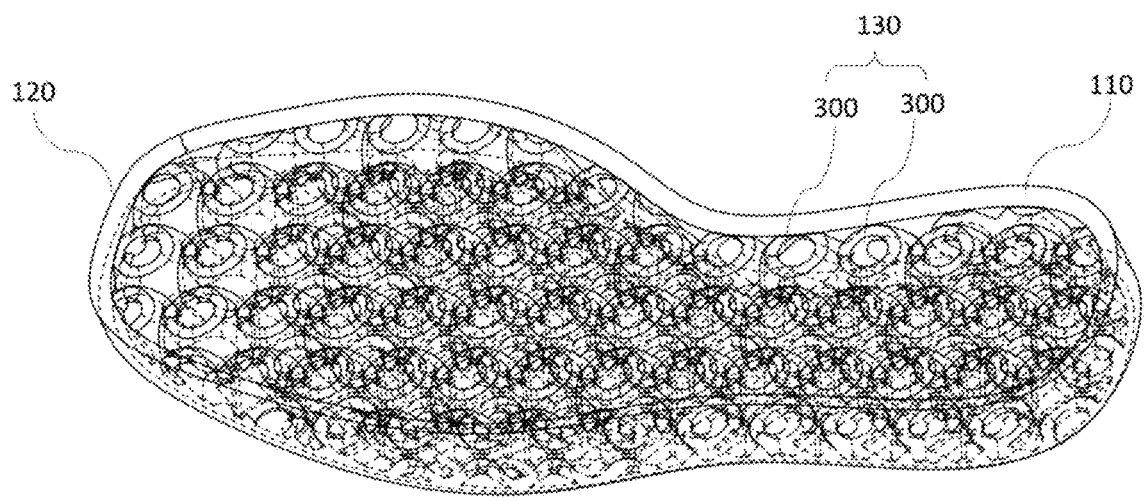
FIG. 1A is a three-dimensional schematic view of an embodiment of a shoe midsole structure according to the present invention.
Figure 1B:
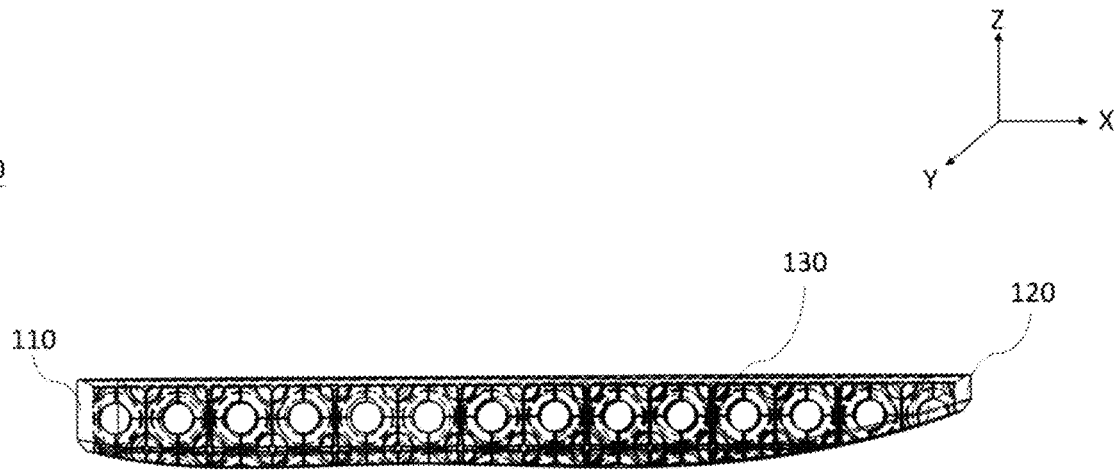
FIG. 1B is a side view of the shoe midsole structure in FIG. 1A.
Figure 2A:
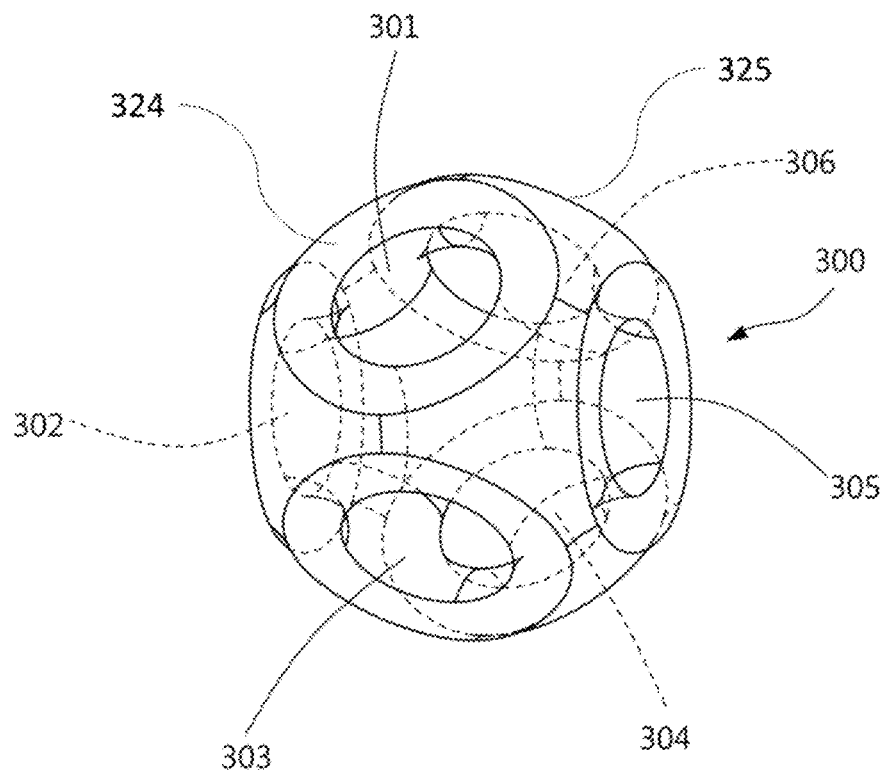
FIG. 2A is a three-dimensional schematic view of a hollow particle unit in a shoe midsole structure according to the present invention.
Figure 2B:
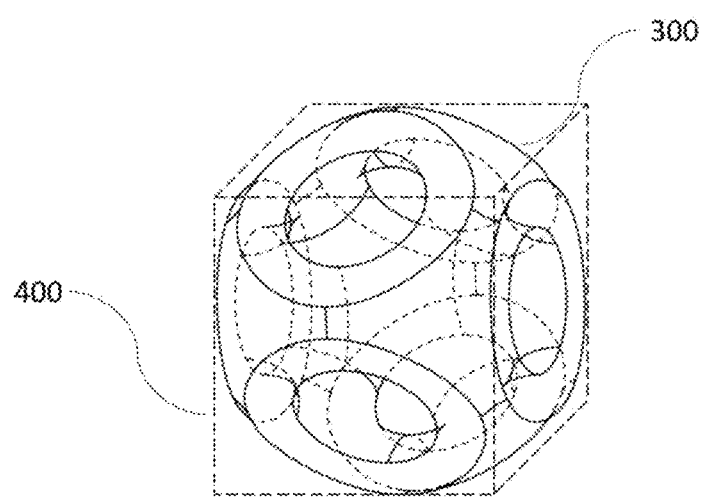
FIG. 2B is a schematic view of the hollow particle unit in FIG. 2A being accommodated in a virtual cube.
Figure 2C:
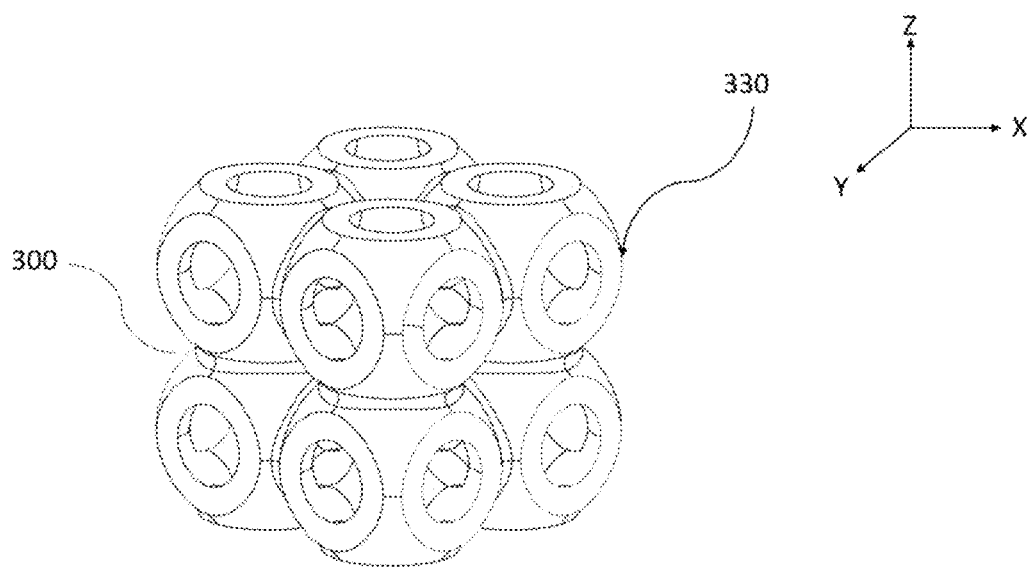
FIG. 2C is a three-dimensional schematic view of a lattice structure formed of a plurality of hollow particle units in FIG. 2A.

First, FIG. 1A and FIG. 1B are respectively a three-dimensional view and a side view of a shoe midsole 100 according to an embodiment of the present invention. The shoe midsole 100 comprises at least one physical flexible laminate 130, and the physical flexible laminate has a cushioning function of decreasing vibration and absorbing stress. The physical flexible laminate comprises a plurality of hollow particle units 300 uniformly arranged in the X-axis direction, the Y-axis direction, and the Z-axis direction and evenly distributed as a lattice matrix of an array grid in an identical plane. Next, FIG. 2A, FIG. 2B, and FIG. 2C are schematic structural views of the hollow particle units 300. Each of the hollow particle units 300 is a hollow housing body having a specific thickness. A housing layer of each of the hollow particle units has a plurality of openings 301 to 306 formed penetrating the housing layer, a plurality of planar annular portions 324 surrounding each of the openings 301 to 306, and a plurality of curved portions 325 connecting adjacent planar annular portions 324. In this embodiment, the hollow particle units 300 has an oblate shape, and the openings 301 to 306 are disposed in pair in the X-axis direction, the Y-axis direction, and the Z-axis direction on the housing layer of the hollow particle unit 300 symmetrically with respect to the geometric centroid of the hollow particle units 300. Preferably, the hollow particle units 300 have the same equivalent diameter L and can be respectively accommodated in a virtual cube 400 having the same size, as shown in FIG. 2B. In this embodiment, the openings 301 to 306 are disposed in the X-axis direction, the Y-axis direction, and the Z-axis direction on each of the hollow particle units 300. For example, adjacent hollow particle units 300 on which the opening 301 and the opening 304 are disposed in pair and opposite to each other, the opening 302 and the opening 305 are disposed in pair and opposite to each other, and the opening 303 and the opening 306 are disposed in pair and opposite to each other can abut each other via the planar annular portions to form a lattice structure 390, as shown in FIG. 2C. In this way, the lattice structure 390 stacked in this manner does not need an additional support structure during additive manufacturing.

In this embodiment, the shoe midsole 100 may be additively manufactured using a three-dimensional printing technology, for example, using technologies such as fused deposition molding, vat photopolymerization, and SLS. For a midsole having the lattice structure of the hollow particle units 300, three-dimensional printing may be performed without any support structure. In this way, additive manufacturing becomes more efficient and faster, because the printing time and the processing time can be greatly reduced. In addition, this is also beneficial in terms of material and energy. Because no support structure is used, less energy and fewer materials are consumed. Moreover, eventually, the midsole may be joined to an insole and an outsole and is then combined with an upper.

The structures of the hollow particle units 300 are bent when a compression force or a shearing force is applied during use. Such a continuous structure may be made of any elastic and/or viscoelastic material and is used for cushioning or energy absorption and release. The elastic and/or viscoelastic material is, for example, any one of TPU, an EVA copolymer, nylon 11, and a combination thereof. The continuous structure is suitable for high performance sport shoes such as runners or gym shoes. The structure may have other applications in which cushioning is required, because the lattice structure is highly stable in energy absorption and release.

According to the technical concept of the present invention, the number and sizes of the openings depend on the foot pressure applied by an individual user to the lattice structure and an amount of deformation required by a current type of shoes. For example, the number of the openings is set to N, and N satisfies the following relationship:

$$100 \geq N \geq 2, \text{ and } N \text{ is even.}$$

Preferably, when N is equal to two, the two openings are symmetrically disposed in any one of the X-axis direction, the Y-axis direction, and the Z-axis direction of the hollow particle units. When N is equal to four, the four openings are symmetrically disposed in any two of the X-axis direction, the Y-axis direction, and the Z-axis direction of the hollow particle units. When N is equal to six, the six openings are disposed in pair in the X-axis direction, the Y-axis direction, and the Z-axis direction of the hollow particle units. When N is greater than six, the six openings are disposed in pair symmetrically in the X-axis direction, the Y-axis direction, and the Z-axis direction of the hollow particle units, and the remaining openings are disposed in pair at other locations on the housing layer symmetrically with respect to the geometric centroid of the hollow particle units. For example, N may be 50 or even 100. The apertures of the openings may be the same or different. Alternatively, six openings that are disposed in pair symmetrically in the X-axis direction, the Y-axis direction, and the Z-axis direction of the hollow particle units have the same aperture, and the aperture of other openings is less than the aperture of the six openings. Further, according to the technical concept of the present invention, the number of the openings is optimally 6.

In addition, when the equivalent aperture of the openings 301 to 306 is set to R, and the ring width of the planar annular portion 324 adjacent to the openings is set to W, R is between 1 mm and 10 mm, W is between 1 mm and 15 mm, and the ratio of R to W satisfies the following relationship:

$$25 \geq R/W \geq 0.01.$$

Moreover, according to the technical concept of the present invention, the size of the hollow particle units 300 depends on aesthetic considerations, a user's foot pressure, and additive manufacturing capability. Generally, the equivalent diameter of each of the hollow particle units is set to L, and L is between 4 mm and 16 mm. The equivalent diameters L of the hollow particle units may be the same or different. Preferably, the equivalent diameters L of the hollow particle units are the same. Further, if SLS is used to perform three-dimensional printing molding, the particle diameter distribution of a powder material is also one of the parameters that need to be considered.

In FIG. 2C, the hollow particle units 300 may be proliferated into a plurality of lattice structures 390 through three-dimensional printing and are adjacently connected laminate by laminate. All the hollow particle units 300 in the physical flexible laminate are connected in this manner. Therefore, when a user's foot pressure is applied on a single hollow particle unit 300, hollow particle units 300 in an adjacent laminate or a next laminate is affected together.

Next, referring to FIG. 1A to 1B, a solid layer 110 may further be disposed in the shoe midsole 100. In this embodiment, the solid layer 110 is disposed on an outer circumference of the physical flexible laminate. In addition, in another embodiment, the solid layer 110 may extend to an upper surface of the physical flexible laminate for connecting an insole of a sole and an upper. The solid layer 110 may alternatively extend to a lower surface of the physical flexible laminate to be used as an outsole of the sole or be joined to an additional outsole. The surface of the solid layer 110 may be flat or slightly inclined, depending on an arrangement location of the solid layer 110 and an actual design requirement. In addition, the solid layer 110 may be additively manufactured, or may be manufactured using another technology, and a related joining material is used to wind or fix the solid layer 110 and the physical flexible laminate. The size and material of the solid layer 110 may be changed corresponding to different designs.

In addition, according to the style and type of shoes, a toe portion 120 of the shoe midsole 100 may further be modified and manufactured to be solid and connected to the solid layer 110 but have no lattice structure.

Figure 3A:
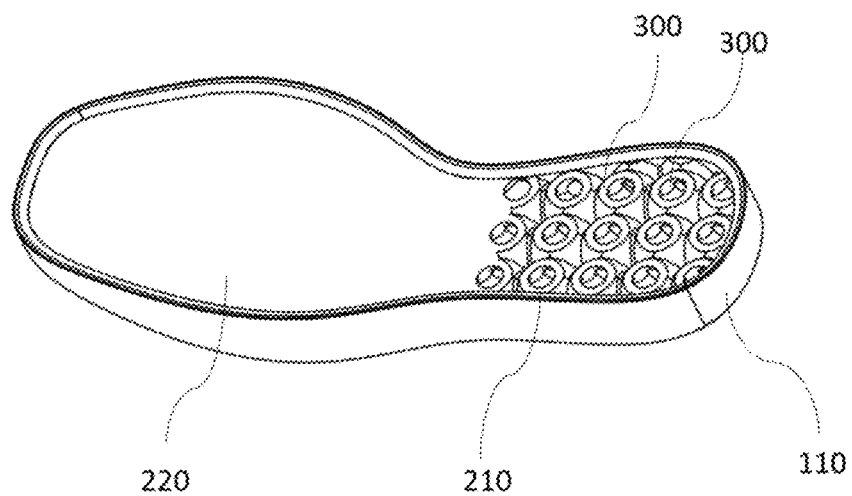
FIG. 3A is a three-dimensional schematic view of another embodiment of a shoe midsole structure according to the present invention.
Figure 3B:
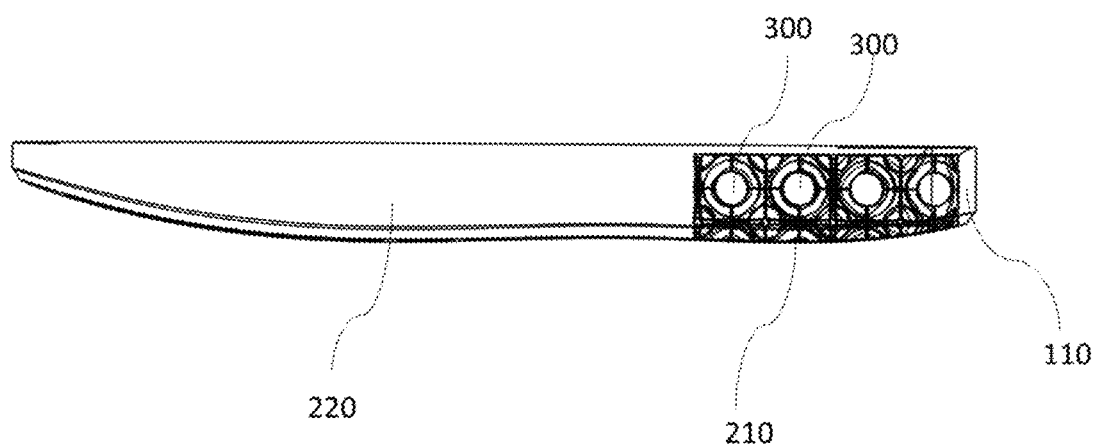
FIG. 3B is a side view of the shoe midsole structure in FIG. 3A.

Next, FIG. 3A and FIG. 3B are respectively a three-dimensional view and a side view of a shoe midsole 200 according to another embodiment of the present invention. The hollow particle units 300 may be arranged in a partial region of the shoe midsole 200, and the size of the region may be flexibly adjusted. In this embodiment, the hollow particle units 300 are arranged at the location of a heel portion 210, and a sole portion 220 has a planar structure, and in addition, may be combined with different lattice structures manufactured using another three-dimensional printing technology or any another manufacturing technology. This shoe midsole not only is suitable for trainers but also is suitable for other types of shoes such as sandals, hiking shoes, safety boots, tennis shoes, and gym shoes.

Figure 4A:
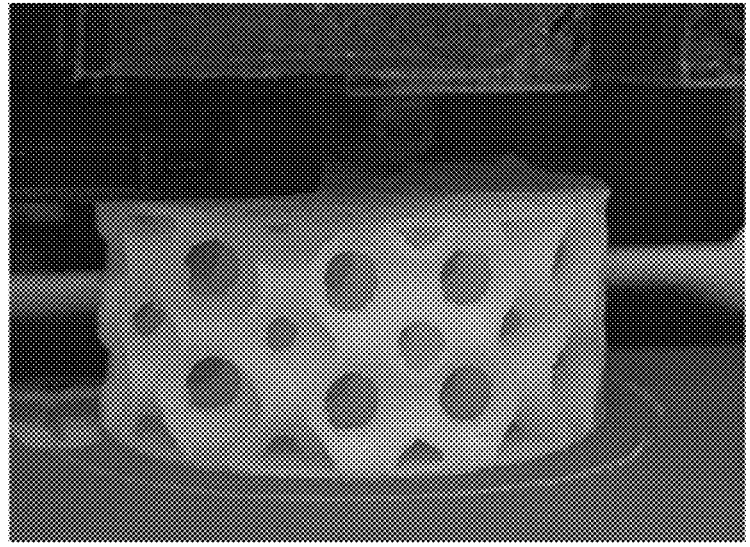
FIG. 4A is a schematic view of additively manufacturing a lattice structure using a method of fused deposition molding.
Figure 4B:
FIG. 4B is a schematic view of a lattice structure using a method of FIG. 4A.

FIG. 4A and FIG. 4B are respectively a schematic view of additively manufacturing a lattice structure 390 using a fused deposition molding method with a three-dimensional printing apparatus and a schematic view of a finished product. It is confirmed that the lattice structure 390 is a supportless lattice structure and does not need a support structure during printing. The lattice structure 390 formed using three-dimensional printing may be directly applied to a shoe midsole, and a post-treatment step of removing the support structure can be omitted. The supportless lattice structure 390 may be proliferated in the midsole 100, and the efficiency of additive manufacturing is improved in terms of material, speed, and energy.

Figure 5:
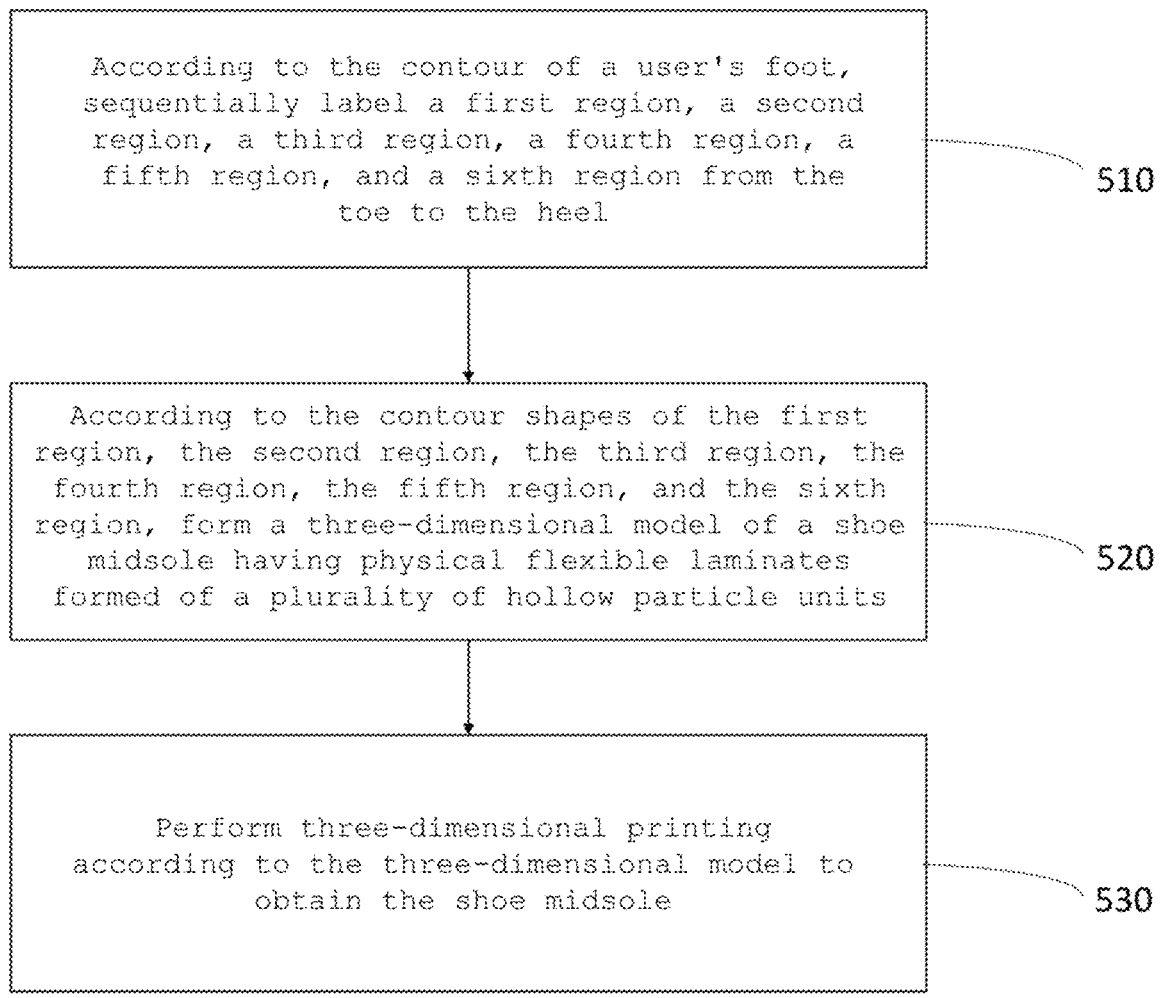
FIG. 5 is a standard flowchart of a method for manufacturing a shoe midsole structure according to the present invention.

Next, FIG. 5 shows a method for manufacturing a shoe midsole according to the present invention, and a procedure of using single hollow particle units customize a midsole for an individual user is described. The method includes the following steps.

Step 510: According to the contour of a user's foot, sequentially label a first region, a second region, a third region, a fourth region, a fifth region, and a sixth region from the toe to the heel.

Step 520: According to the contour shapes of the first region, the second region, the third region, the fourth region, the fifth region, and the sixth region, form a three-dimensional model of a shoe midsole having at least one physical flexible laminate.

Step 530: Perform three-dimensional printing according to the three-dimensional model to obtain the shoe midsole.

In step 510, a video scanning apparatus may be used to scan the user's foot to acquire the contour of the user's foot data. According to the user's foot and pressure distribution data of gait analysis, a first region, a second region, a third region, a fourth region, a fifth region, and a sixth region are sequentially labeled from the toe to the heel for the contour of the user's foot.

Different regions bear unidentical pressure. Generally, the third region and the sixth region bear the highest pressure, the first region and the fourth region bear the lowest pressure, and the second region and the fifth region bear intermediate pressure between the highest and lowest pressure. However, the present invention is not limited thereto. The actual pressure in the region changes as the gait changes when a user is still, walking, running, or doing cross training.

In step 520, hollow particle units of the same physical flexible laminate in the first region to the sixth region have the same equivalent diameter. In the hollow particle units in the regions, the ratios of the equivalent apertures of the openings of the hollow particle units to the ring widths of the planar annular portions may be the same or different.

Figure 6A:
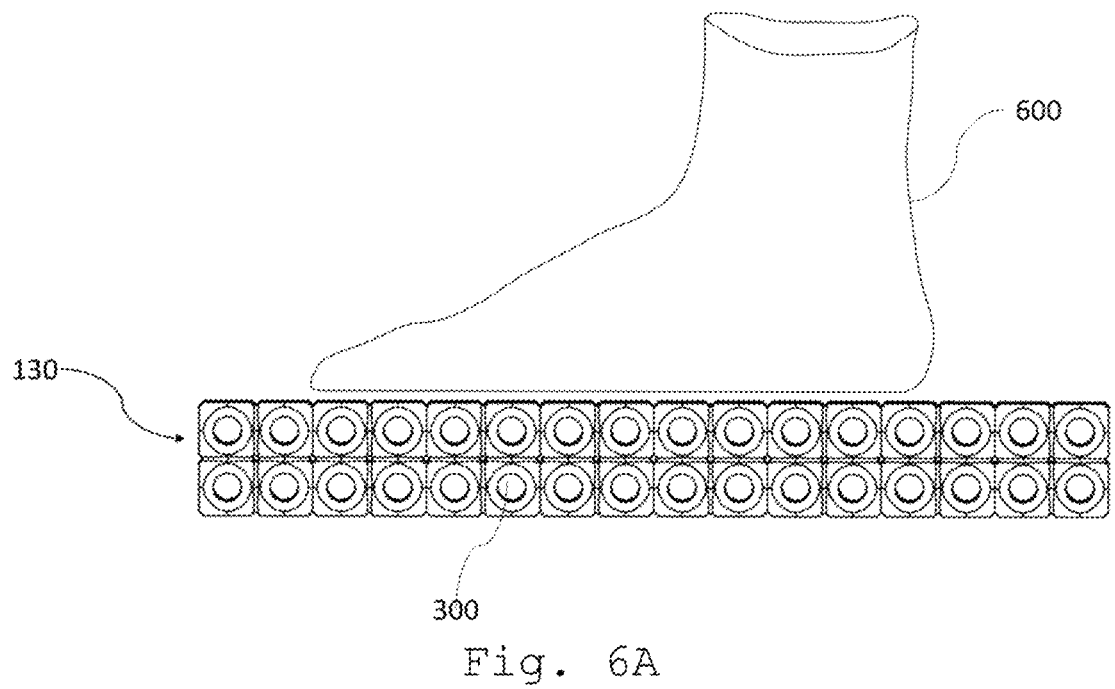
FIG. 6A and FIG. 6B are schematic views of a process of arranging hollow particle units to form a physical flexible laminate after the contour of a user's foot is used according to an embodiment of the present invention.
Figure 6B:
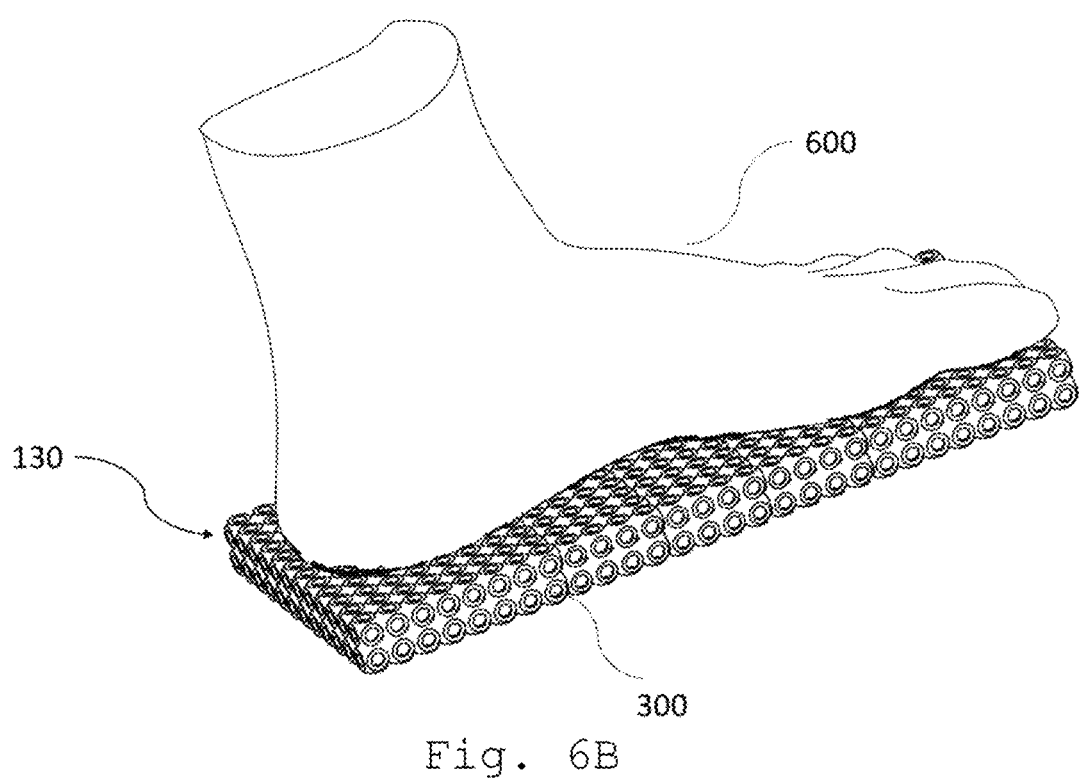

For example, FIG. 6A and FIG. 6B are schematic views of a process of arranging the hollow particle units to form a physical flexible laminate after the contour 600 of the user's foot is acquired according to an embodiment of the pre sent invention. In this embodiment, the highest pressure that the shoe midsole bears when the user is doing cross training is described. In this case, the first region to the sixth region bear the same pressure. Therefore, the ratios of the equivalent apertures of the openings of the hollow particle units to the ring widths of the planar annular portions are the same. In this case, when the user is doing intense cross training, the regions in the shoe midsole can evenly share the highest pressure applied by the user.

Figure 7:
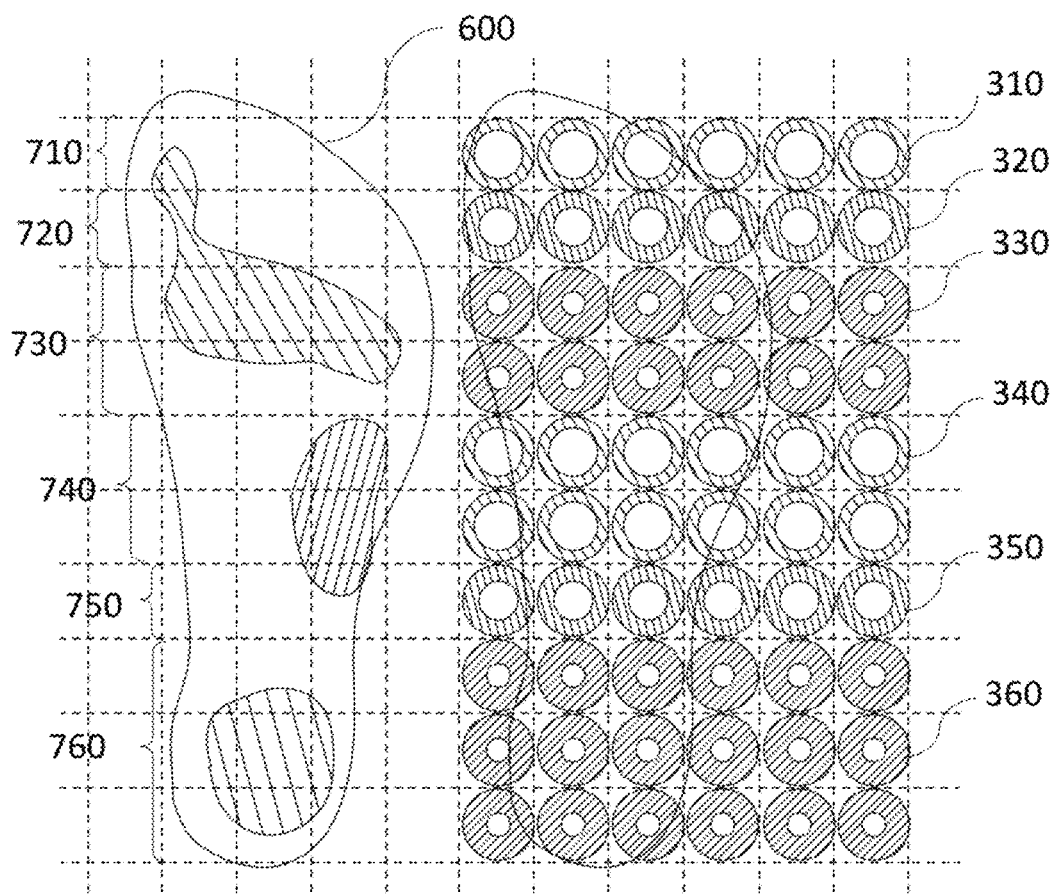
FIG. 7 is schematic views of a process of arranging hollow particle units to form a physical flexible laminate after the contour of a user's foot is used according to another embodiment of the present invention.

In addition, FIG. 7 is a schematic view of a process of arranging the hollow particle units to form the physical flexible laminate after the contour 600 of the user's foot is acquired according to another embodiment of the present invention. In this embodiment, in consideration of normal cases, different hollow particle units 310, 320, 330, 340, 350, and 360 are designed according to different pressure that a first region 710, a second region 720, a third region 730, a fourth region 740, a fifth region 750, and a sixth region 760 bear.

When the equivalent aperture of the openings of the hollow particle unit 310 disposed in the first region 710 is set to R1, and the ring width of the planar annular portion is set to W1, the ratio of R1 to W1 satisfies the following relationship:

$$10 \geq R1/W1 \geq 0.01.$$

When the equivalent aperture of the openings of the hollow particle unit 320 disposed in the second region 720 is set to R2, and the ring width of the planar annular portion is set to W2, the ratio of R2 to W2 satisfies the following relationship:

$$10 \geq R2/W2 \geq 0.1.$$

When the equivalent aperture of the openings of the hollow particle unit 330 disposed in the third region 730 is set to R3, and the ring width of the planar annular portion is set to W3, the ratio of R3 to W3 satisfies the following relationship:

$$15 \geq R3/W3 \geq 0.1.$$

When the equivalent aperture of the openings of the hollow particle unit 340 disposed in the fourth region 740 is set to R4, and the ring width of the planar annular portion is set to W4, the ratio of R4 to W4 satisfies the following relationship:

$$25 \geq R4/W4 \geq 1.$$

When the equivalent aperture of the openings of the hollow particle unit 350 disposed in the fifth region 750 is set to R5, and the ring width of the planar annular portion is set to W5, the ratio of R5 to W5 satisfies the following relationship:

$$15 \geq R5, \text{ and } W5 \geq 0.1.$$

When the equivalent aperture of the openings of the hollow particle unit 360 disposed in the sixth region 760 is set to R6, and the ring width of the planar annular portion is set to W6, the ratio of R6 to W6 satisfies the following relationship:

$$1 \geq R6/W6 \geq 0.01.$$

In the foregoing embodiment, the number of the plurality of openings of each of the hollow particle units 310, 320, 330, 340, 350, and 360 in the first region 710 to the sixth region 760 is six, and the present invention is not limited thereto. In addition, the hollow particle units disposed in the first region, the second region, the third region, the fourth region, the fifth region, and the sixth region may have the same number of openings or different numbers of openings.

Figure 8A:
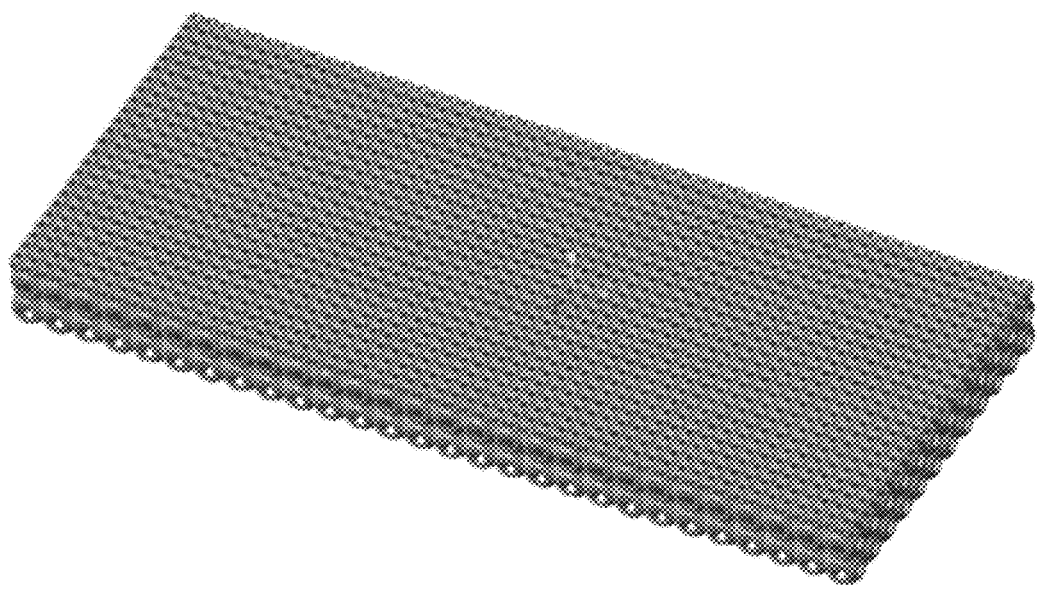
FIG. 8A and FIG. 8B are schematic views of arranging hollow particle units to form a physical flexible laminate after the contour of a user's foot is used according to another embodiment of the present invention.

In addition, FIG. 8A is a schematic view of arranging the hollow particle units to form the physical flexible laminate after the contour 600 of the user's foot is acquired according to still another embodiment of the present invention. In this embodiment, there are three physical flexible laminates, and the equivalent diameter of the hollow particle units disposed in the first (top) physical flexible laminate is less than the equivalent diameter of the hollow particle units in the second physical flexible laminate and the third physical flexible laminate, and the ring widths of the planar annular portions of the hollow particle units disposed in the regions may also be the same or different.

Figure 8B:
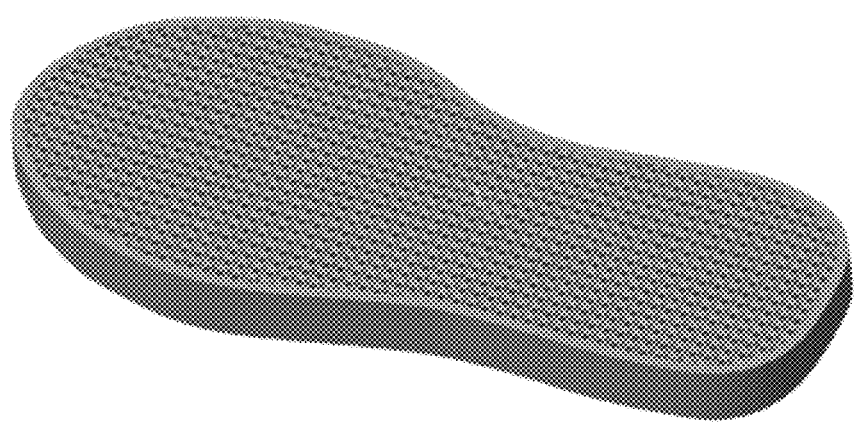

In addition, according to the technical concept of the present invention, step 520 further includes: according to the contour of the user's foot, forming a corresponding solid layer on an outer circumference, an upper surface and/or a lower surface of the physical flexible laminate, as shown in FIG. 8B.

Figure 9A:
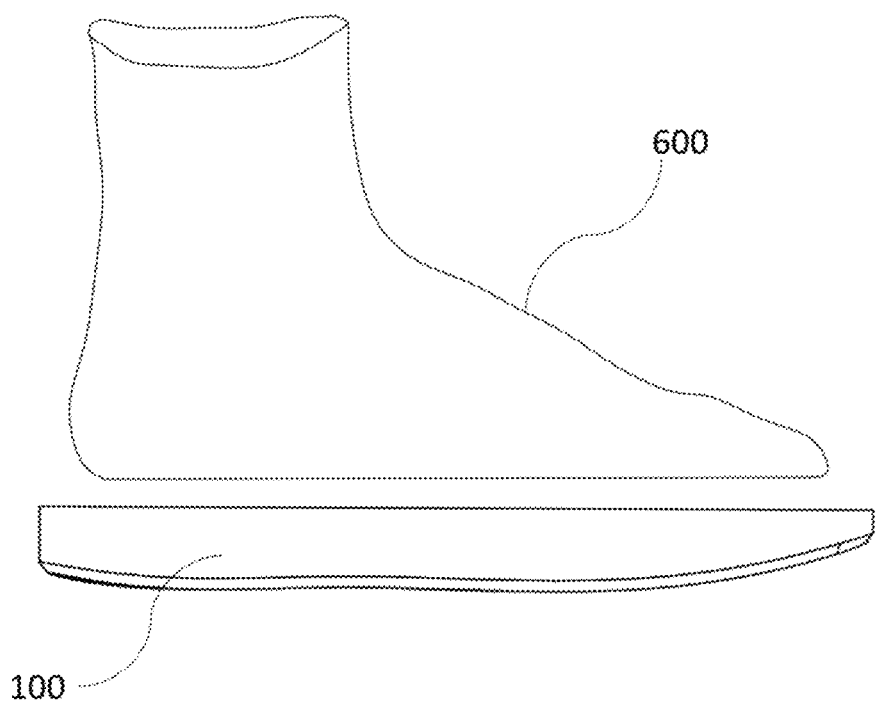
FIG. 9A and FIG. 9B are respectively schematic views of a front view and a side view for confirmation by a user after a shoe midsole is completed.
Figure 9B:
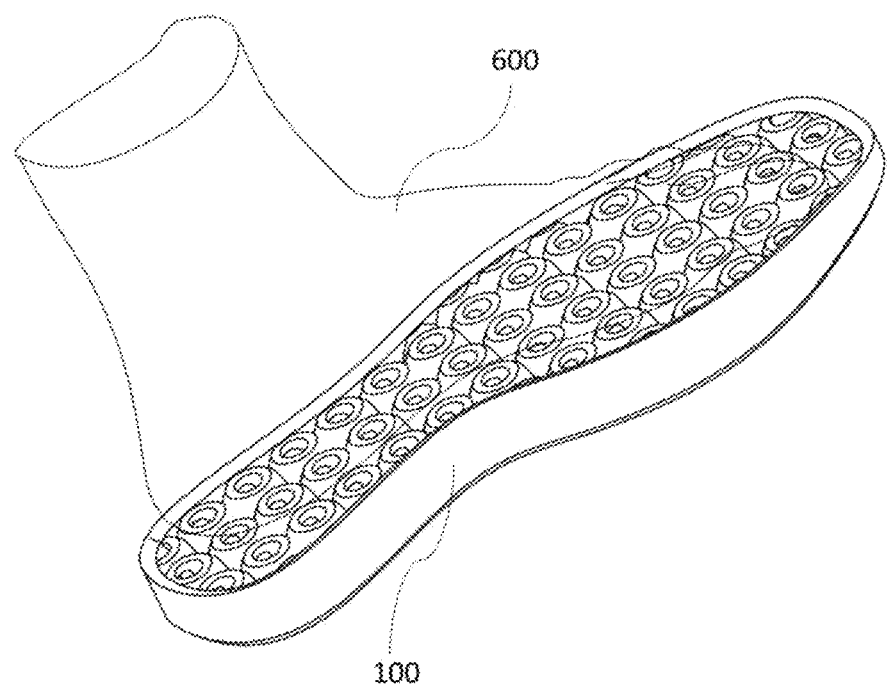

After the three-dimensional model of the shoe midsole is acquired using the foregoing step 520, in step 530, three-dimensional printing may be performed using fused deposition molding, SLS, and vat photopolymerization to further obtain the shoe midsole of the present invention. FIG. 9A and FIG. 9B are respectively a schematic front view and a schematic side view for confirmation by the user after the shoe midsole is completed. When it is found after examination that the shoe midsole is suitable for the user's foot, the shoe midsole 100 may further be assembled with an insole, an outsole, and an upper to further complete shoes satisfying the user's requirements.

Next, the following describes tests (using the MTS 10 kN Load-Cell Compression Tester) of final stiffness and energy return percentage (ERP) performed for hollow particle units with different sizes.

Each of a test sample A to a sample D is a hollow cylinder (as shown in FIG. 4A and FIG. 4B) having a diameter of 38 mm, a height of 17 mm, and a top portion and a bottom portion with a thickness of 0.5 mm. The interior of each hollow cylinder is made of hollow particle units with different sizes shown in Table 1.

First, a load is applied to a sample at a displacement speed of 5 mm/min. When a displacement amount reaches 35%, the load on the sample is unloaded at the same displacement speed. After 20 loading-unloading cycles, displacement amounts of the sample under different loads at the $20^{th}$ cycle are measured, so as to further draw a corresponding loading curve and unloading curve. The final stiffness of the sample is the slope at the starting point of the loading curve, and the ERP is a ratio of the area under the unloading curve to the area under the loading curve. The values of the stiffness and ERP of hollow particle units with different sizes are shown in Table 1.

TABLE 1

| | Size of hollow particle unit | | | |
| --- | --- | --- | --- | --- |
| | Equivalent diameter L (mm) | Ring width W of planar annular portion (mm) | Final stiffness (N mm) | ERP (%) |
| Sample A | 8 | 0.6 | 110 | 68.2% |
| Sample B | 8 | 0.8 | 95.84 | 69.92% |
| Sample C | 8 | 1.0 | 172.68 | 70.43% |
| Sample D | 8 | 1.2 | 238.87 | 70.03% |

As can be seen from the results in the foregoing Table 1, in the case of the same equivalent diameter, if the ring width W is smaller, the final stiffness of a hollow particle unit is smaller, and the ERP is lower. In other words, shoe midsoles suitable for different users or uses can be designed by adjusting the sizes of hollow particle units and combining hollow particle units. For example, there may be weight-lifting training in cross training, and shoes inserts with relatively high rigidity need to be used to bear the weight in addition to the body weight of the athlete. Therefore, a hollow particle unit with the size shown by the sample C or the sample D may be used. Further, for an athlete who does running training, relatively high cushioning is required during running. Therefore, a hollow particle unit with the size shown by the sample A or the sample B may be used to manufacture shoes inserts.

Further, a user whose foot length is 22.5 centimeters is used as an example below to describe size data of different shoe midsoles:

1. When a shoe midsole has the structure shown in FIG. 6A, hollow particle units in the physical flexible laminate have the same size, as shown in the following Table 2.

TABLE 2

| | Size of hollow particle unit | | | | | |
| --- | --- | --- | --- | --- | --- | --- |
| Region | Length of each region (mm) | Equivalent diameter L (mm) | Ring width W of planar annular portion (mm) | Number of openings | Equivalent aperture R of openings (mm) | Number of physical flexible laminates |
| First region | 24 | 8 | 0.6 | 6 | 4 | 2 |
| Second region | 24 | 8 | 0.6 | 6 | 4 | 2 |
| Third region | 40 | 8 | 0.6 | 6 | 4 | 2 |
| Fourth region | 40 | 8 | 0.6 | 6 | 4 | 2 |
| Fifth region | 24 | 8 | 0.6 | 6 | 4 | 2 |
| Sixth region | 72 | 8 | 0.6 | 6 | 4 | 2 |

2. When a shoe midsole has the structure shown in FIG. 7, the sizes of hollow particle units in the regions are shown in the following Table 3.

TABLE 3

| | Size of hollow particle unit | | | | | |
| --- | --- | --- | --- | --- | --- | --- |
| Region | Length of each region (mm) | Equivalent diameter L (mm) | Ring width W of planar annular portion (mm) | Number of openings | Equivalent aperture R of openings (mm) | Number of physical flexible laminates |
| First region | 32 | 8 | 1.2 | 6 | 4 | 2 |
| Second region | 32 | 8 | 1.2 | 6 | 4 | 2 |
| Third region | 32 | 8 | 1.0 | 6 | 4 | 2 |
| Fourth region | 32 | 8 | 0.8 | 6 | 4 | 2 |
| Fifth region | 32 | 8 | 1.0 | 6 | 4 | 2 |
| Sixth region | 64 | 8 | 1.2 | 6 | 4 | 2 |

3. When a shoe midsole has the structure shown in FIG. 8A, the sizes of hollow particle units in the regions are shown in the following Table 4.

TABLE 4

| Region | | Size of hollow particle units | | | | | |
| --- | --- | --- | --- | --- | --- | --- | --- |
| | | Length of each region (mm) | Equivalent diameter L (mm) | Ring width W of planar annular portion (mm) | Number of openings | Equivalent aperture R of openings (mm) | Number of physical flexible laminates |
| First region | Top laminate | 32 | 4 | 0.6 | 6 | 4 | 1 |
| | Bottom laminate | 32 | 8 | 1.2 | 6 | 4 | 2 |
| Second region | Top laminate | 32 | 4 | 0.6 | 6 | 4 | 1 |
| | Bottom laminate | 32 | 8 | 1.2 | 6 | 4 | 2 |

TABLE 4-continued

| | | Size of hollow particle units | | | | | |
|---|---|---|---|---|---|---|---|
| Region | | Length of each region (mm) | Equivalent diameter L (mm) | Ring width W of planar annular portion (mm) | Number of openings | Equivalent aperture R of openings (mm) | Number of physical flexible laminates |
| Third region | Top laminate | 32 | 4 | 0.6 | 6 | 4 | 1 |
| | Bottom laminate | 32 | 8 | 1.2 | 6 | 4 | 2 |
| Fourth region | Top laminate | 32 | 4 | 0.6 | 6 | 4 | 1 |
| | Bottom laminate | 32 | 8 | 0.8 | 6 | 4 | 2 |
| Fifth region | Top laminate | 32 | 4 | 0.6 | 6 | 4 | 1 |
| | Bottom laminate | 32 | 8 | 1.0 | 6 | 4 | 2 |
| Sixth region | Top laminate | 64 | 4 | 0.6 | 6 | 4 | 1 |
| | Bottom laminate | 64 | 8 | 1.2 | 6 | 4 | 2 |

The foregoing Table 1 to Table 3 describe that the shoe midsole structure of the present invention may be formed of hollow particle units with a fixed size or a plurality of hollow particle units having different sizes. Therefore, the hollow particle units can be designed and combined according to a user's requirement to achieve customization. Moreover, the hollow particle units do not need an additional support structure during 3D printing. Therefore, the production efficiency can be improved.

As discussed above, the content of the present invention has been described in detail by using the examples in the foregoing embodiments. However, the present invention is not limited to these implementations. A person of ordinary skill in the art of the present invention should understand that various variations and modifications may be made without departing from the spirit and scope of the present invention. For example, the technical content described in the foregoing embodiments is combined or changed to obtain new implementations. Such implementations should be regarded as the content of the present invention. Therefore, the scope of the application seeks encompasses the appended claims and the scope defined by the claims.

What is claimed is:

1. A shoe midsole structure comprising at least one physical flexible laminate having a cushioning function of decreasing vibration and absorbing stress, which is characterized in that the physical flexible laminate comprises a plurality of hollow particle units uniformly disposed and evenly distributed in the X-axis, the Y-axis, and the Z-axis direction and evenly distributed as a lattice matrix of an array grid in an identical plane;

each of the hollow particle units comprises a housing layer having a specific thickness and a hollow interior, of which on the housing layer, a plurality of openings, a plurality of planar annular portions surrounding each of the openings, and a plurality of curved portions connecting adjacent planar annular portions are formed; and plurality of openings are disposed in pair on the housing layer symmetrically with respect to the geometric centroid of the hollow particle units.

2. The shoe midsole structure according to claim 1, wherein the number of the plurality of openings of the hollow particle units set to N, and N satisfies the following relationship:

$100 \geq N \geq 2$, and $N$ is even.

3. The shoe midsole structure according to claim 2, wherein the number of the plurality of openings is six, and the openings are disposed opposite to each other in the X-axis, the Y-axis, and the Z-axis direction of the hollow particle units, and adjacent hollow particle units are connected to each other via the annular portions.

4. The shoe midsole structure according to claim 1, wherein an equivalent diameter L of each of the hollowed particle units is between 4 mm and 16 mm.

5. The shoe midsole structure according to claim 1, wherein when the equivalent aperture of the openings is set to R, and the ring width of the annular portion adjacent to the openings is set to W, the ratio of R to W satisfies the following relationship:

$25 \geq R/W \geq 0.01$.

6. The shoe midsole structure according to claim 1, wherein the physical flexible laminate has more than two layers.

7. The shoe midsole structure according to claim 1, further comprising at least one solid layer disposed on an outer circumference, an upper surface, and/or a lower surface of the physical flexible laminate.

* * * * *